United States Patent Office 3,057,874
Patented Oct. 9, 1962

3,057,874
METAPHOSPHORIC ACID SALT OF 1-(1-PYRRO-LIN-2-YL)-2-PYRROLIDINONE
William O. Ney, Jr., Lincoln Township, Washington County, and Joseph La Mar Zollinger, Woodbury Township, Washington County, Minn., assignors to Minnesota Mining and Manufacturing Company, St. Paul, Minn., a corporation of Delaware
No Drawing. Filed Feb. 27, 1961, Ser. No. 91,621
5 Claims. (Cl. 260—326.3)

This invention relates to a process for the preparation of heterocyclic compounds and more particularly to a process for the preparation of 1-(1-pyrrolin-2-yl)-2-pyrrolidinone.

It is a principal object of this invention to provide a method for the preparation of 1-(1-pyrroline-2-yl)-2-pyrrolidinone. Other objects will become evident hereinafter.

The compound 1-(1-pyrrolin-2-yl)-2-pyrrolidinone can be represented by the structural formula:

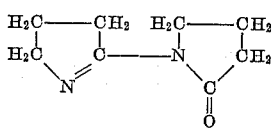

This compound can be named 1-(1-pyrrolin-2-yl)-2-pyrrolidinone according to standard chemical nomenclature or can also be referred to as 2-(2-pyrrolidon-1-yl)-1-pyrroline. It may be designated pyrrolinyl pyrrolidone for convenience, or may be termed anhydropyrrolidone with reference to the method for its preparation. The compound is a white crystalline solid which is soluble in most organic solvents including pyrrolidone and in water. It is useful as an activator for the base-catalyzed polymerization of 2-pyrrolidone.

In accordance with the above and other objects of the invention, it has been found that anhydropyrrolidone can be produced from 2-pyrrolidone. Broadly speaking, the process of the invention comprises the condensation of two molecules of pyrrolidone under dehydrating conditions with the elimination of one molecule of water to produce 1-(1-pyrrolin-2-yl)-2-pyrrolidinone. The process of the invention involves heating 2-pyrrolidone in the presence of a substantially non-acylating, at least potentially acidic, dehydrating agent under non-oxidizing conditions, to a temperature in the range of about 50° C. to 250° C. The reaction proceeds more slowly at the lower temperatures and optimum results are obtained by heating at 100° C. to 200° C.

The dehydrating agents which can be employed are exemplified by phosphorus pentoxide and the like. They are used in amounts from about 25 to 125 percent by weight of the amount of 2-pyrrolidone employed.

In the course of the process, the salt of 1-(1-pyrrolin-2-yl)-2-pyrrolidinone with the dehydrating agent, e.g. with metaphosphoric acid, is formed. This salt is a glassy white solid, and can be recovered from the reaction mixture as such, by avoiding the presence of moisture during the process. Addition of water to the salt brings about an acidic hydrolysis of the reaction product to 2-pyrrolidone. When the salt is neutralized with a base, preferably with a saturated solution of an inorganic base such as potassium carbonate, the 1-(1-pyrrolin-2-yl)-2-pyrrolidinone desired is formed and recovered. Accordingly, the reaction mixture is preferably added to a stoichiometric excess of a concentrated aqueous base, to prevent any possibility of the occurrence of acidic conditions. The product is isolated by effectively removing the dehydrating agent, as by neutralization, and then utilizing the difference in solubility properties between 2-pyrrolidone and 1-(pyrrolin-2-yl)-2-pyrrolidinone. The desired product accordingly can be extracted from the residue with suitable solvents, and purified e.g. by recrystallization from solution in an organic solvent.

The following examples more specifically illustrate the process of the invention and the recovery of 1-(1-pyrrolin-2-yl)-2-pyrrolidinone. All parts are by weight unless otherwise specified.

EXAMPLE 1

A mixture of 10 grams of pyrrolidone (previously fractionally distilled under reduced pressure to remove the more volatile impurities and butyrolactone) and 10 grams of phosphorus pentoxide is made by stirring the pyrrolidone while gradually adding the phosphorus pentoxide thereto, whereupon a thick slurry is formed with an increase in temperature to about 80° to 90° C. This slurry is heated with stirring, an exothermic reaction occurs at about 120° to 130° C. which raises the temperature to about 180° C. and the mixture is further heated with stirring until the temperature of the mixture reaches 200° C., and the mixture is then cooled. The reaction mixture solidifies to a glass on cooling, and at this point consists essentially of the metaphosphoric acid salt of 1-(1-pyrrolin-2-yl)-2-pyrrolidinone. The salt is pulverized and added to an excess of saturated aqueous potassium carbonate solution. Most of the material dissolves and the solution, which has a volume of about 100 ml. and contains some suspended solids, is extracted 3 times with about 35 ml. quantities of chloroform. The chloroform extracts are combined and the chloroform is evaporated. About 7 grams of a tan-colored crystalline material are obtained, which is recrystallized from n-hexane. The white crystalline solid thus obtained is 1-(1-pyrrolin-2-yl)-2-pyrrolidinone. The compound melts at about 62.0–62.5° C., using a Fisher-John melting point apparatus, sublimes at 50 to 55° C. at 0.05 mm. of Hg and boils at about 102° to 103° C. at 1.2 mm. of Hg pressure and is very soluble in water, alcohols such as methanol and ethanol, esters such as ethyl acetate and butyl acetate, ketones such as acetone and methyl ethyl ketone, aromatic solvents, e.g. benzene and the like, and somewhat less soluble in hexane and petroleum ether. In water solution, it is strongly basic.

Analysis.—Calculated for $C_6H_{12}N_2O$: C, 63.1%; H, 7.9%; N, 18.4%. Found: C, 63.1%; H, 7.9%; N, 18.5%.

The infrared spectrogram of the compound determined in a mineral oil mull shows peaks at 5.8, 6.2, 7.2, 8.0, 9.2, 9.6 and 10.6 microns.

The 1-(1-pyrrolin-2-yl)-pyrrolidinone thus prepared can be used as an activator for the base-catalyzed polymerization of pyrrolidone. Thus, for example, when pyrrolidone to which has been added 3 mole percent of sodium pyrrolidone as a basic catalyst is treated with 0.32 mole percent of 1-(1-pyrrolin-2-yl)-2-pyrrolidinone, polymerization to hard solid polypyrrolidone melting at about 250° C. takes place in about 46 hours at 50° C. The polymer is comminuted, washed with water and dried. A conversion to polymer of about 74.6 percent is obtained. The polymer has inherent viscosity 1.40.

The metaphosphoric acid salt of 1-(1-pyrrolin-2-yl)-2-pyrrolidinone can be represented by the formula:

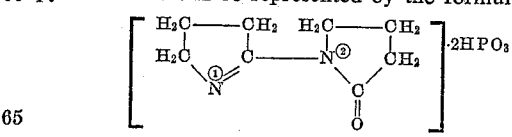

One of the $HPO_3$ molecules is bound to the more strongly basic nitrogen atom marked 1, while the other is bound somewhat less strongly to the more weakly basic nitrogen atom marked 2. The salt can be employed as an activator for the polymerization of pyrrolidone, e.g. using about one-half mole percent of the salt and adding this to anhydrous pyrrolidone containing one mole percent of base in excess of the amount of base employed for catalysis. This salt is preferably recovered from reaction mixtures in which substantially stoichiometric amounts of phosphorus pentoxide and pyrrolidone are reacted, a temperature in the range of 100° C. to 200° C. being employed for a time sufficient to bring about substantially complete reaction.

EXAMPLE 2

The above-described process of preparation employing equal weights of pyrrolidone and phosphorus pentoxide is repeated, the heating of the reaction mixture being carried out for various times at various temperatures. The reaction mixture is then worked up with the isolation of the 1-(1-pyrrolin-2-yl)-2-pyrrolidinone to produce several lots designated by letters in the following table, in which the variables of time and temperature are set forth. In carrying out the reaction at temperatures in the range in which the reaction becomes exothermic as noted above, i.e. about 120° to 180° C., external cooling is employed to maintain the desired temperature.

*Table 1*

| Lot | Time (min.) | Temperature (° C.) | Yield (percent) |
|---|---|---|---|
| A | 10 | 100 | 40 |
| B | 50 | 100 | 58 |
| C | 105 | 100 | 60 |
| D | 200 | 100 | 64 |
| E | 10 | 150 | 74 |
| F | 30 | 150 | 80 |
| G | 100 | 150 | 61 |
| H | 2 | 200 | 70 |
| I | 10 | 200 | 80 |
| J | 30 | 200 | 76 |
| K | 10 | 250 | 74 |
| L | 50 | 50 | 10 |

It will be seen that the optimum results are obtained by heating in the range of about 100° C. to 200° C. and that at temperatures above about 100 C. there is a gradual decrease in yield when the reaction mixture is heated for prolonged periods. This is accompanied by increasing discoloration of the product so that purification is rendered more difficult.

Substantially similar results are obtained when the amount of phosphorus pentoxide employed varies over the range of about 25 percent to 125 percent of the 2-pyrrolidone by weight. At higher proportions it is more difficult to isolate the product, while at lower proportions the reaction is slower and not quite so efficient and more unreacted pyrrolidone remains. The use of lower proportions of dehydrating agent may be desirable, e.g. when a solution of anhydropyrrolidone in pyrrolidone is to be produced as an activator solution, which is used without isolation of the anhydropyrrolidone. In this case the excess phosphorus pentoxide and the metaphosphoric acid are removed by adding the reaction mixture to a sufficient amount of saturated potassium carbonate solution to neutralize the acid, the liquid layers separated and the pyrrolidone dried, for example, by distillation of a forerun. Alternatively, the reaction mixture as such can be used by adding it, before neutralization, to pyrrolidone containing an amount of base which is in stoichiometric excess of the amount required to neutralize the acid and is sufficient subsequently to catalyze the polymerization. In either case, the amount of activator present in the reaction mixture is readily determined by isolation of the 1-(1-pyrrolin-2-yl)-2-pyrrolidinone from a sample of the mixture.

What is claimed is:

1. In the process for production of 1-(1-pyrrolin-2-yl)-2-pyrrolidinone the steps which comprise heating a mixture of 2-pyrrolidone and phosphorus pentoxide to form the metaphosphoric acid salt of 1-(1-pyrrolin-2-yl)-2-pyrrolidinone, adding the reaction mixture to an excess of an aqueous base, and recovering the 1-(1-pyrrolin-2-yl)-2-pyrrolidinone from the mixture.

2. The process according to claim 1, in which the phosphorus pentoxide is present in amounts ranging from 25% to 125% by weight of the amount of 2-pyrrolidinone.

3. The process according to claim 1, in which the mixture of 2-pyrrolidone and phosphorus pentoxide is heated to a temperature in the range of about 50° C. to 250° C.

4. In the process for producing 1-(1-pyrrolin-2-yl)-2-pyrrolidinone, the steps which comprise heating a mixture of 2-pyrrolidone and from 25 to 125 percent by weight of phosphorus pentoxide base on the amount of 2-pyrrolidone to form the metaphosphoric acid salt of 1-(1-pyrrolin-2-yl)-2-pyrrolidinone, and adding the reaction mixture to a stoichiometric excess of alkali.

5. The metaphosphoric acid salt of 1-(1-pyrrolin-2-yl)-2-pyrrolidinone.

No references cited.